United States Patent
Freeman et al.

(10) Patent No.: US 11,111,796 B1
(45) Date of Patent: Sep. 7, 2021

(54) TURBINE SHROUD ASSEMBLY WITH DOVETAIL RETENTION SYSTEM

(71) Applicants: Rolls-Royce North American Technologies, Indianapolis, IN (US); Rolls-Royce Corporation, Indianapolis, IN (US); Rolls-Royce plc

(72) Inventors: Ted J. Freeman, Danville, IN (US); Aaron D. Sippel, Zionsville, IN (US); Alexandra Baucco, Indianapolis, IN (US); Anthony Razzell, London (GB); Michael J. Whittle, London (GB); Jeffrey Crutchfield, Long Beach, CA (US)

(73) Assignees: Rolls-Royce North American Technologies Inc., Indianapolis, IN (US); Rolls-Royce plc; Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/876,865

(22) Filed: May 18, 2020

(51) Int. Cl.
*F01D 5/22* (2006.01)
*F01D 25/28* (2006.01)
*F01D 25/24* (2006.01)

(52) U.S. Cl.
CPC .......... *F01D 5/225* (2013.01); *F01D 25/243* (2013.01); *F01D 25/28* (2013.01)

(58) Field of Classification Search
None
See application file for complete search history.

(56) References Cited

U.S. PATENT DOCUMENTS

| | | | |
|---|---|---|---|
| 3,892,497 A * | 7/1975 | Gunderlock | F01D 9/042 415/134 |
| 5,222,360 A * | 6/1993 | Antuna | B64D 27/26 60/226.1 |
| 6,467,988 B1 * | 10/2002 | Czachor | F16L 23/036 403/337 |
| 6,733,235 B2 | 5/2004 | Alford et al. | |
| 7,052,235 B2 | 5/2006 | Alford et al. | |
| 9,039,358 B2 | 5/2015 | Tholen et al. | |
| 9,458,726 B2 | 10/2016 | Lamusga et al. | |
| 9,759,082 B2 | 9/2017 | Thomas et al. | |
| 10,030,541 B2 | 7/2018 | Vetters et al. | |
| 10,309,257 B2 | 6/2019 | Sippel et al. | |
| 10,364,693 B2 | 7/2019 | Thomas et al. | |
| 2013/0067930 A1 * | 3/2013 | Paradis | F01D 25/243 60/796 |
| 2016/0123231 A1 * | 5/2016 | Mayer | F23R 3/28 60/740 |
| 2016/0290140 A1 * | 10/2016 | Thomas | F01D 25/246 |
| 2016/0333715 A1 | 11/2016 | McCaffrey | |
| 2016/0376901 A1 * | 12/2016 | O'Leary | F01D 9/02 415/116 |
| 2016/0376906 A1 * | 12/2016 | O'Leary | F01D 9/04 415/173.1 |
| 2017/0002674 A1 * | 1/2017 | Vetters | F01D 25/246 |

(Continued)

*Primary Examiner* — Michael Lebentritt
(74) *Attorney, Agent, or Firm* — Barnes & Thornburg LLP

(57) ABSTRACT

A turbine shroud assembly for use with a gas turbine engine includes a turbine outer case, a blade track segment, and a carrier assembly. The turbine outer case is arranged around an axis. The blade track segment is configured to define a portion of a gas path of the gas turbine engine. The carrier assembly is coupled to the turbine outer case and supports the blade track segment.

20 Claims, 7 Drawing Sheets

(56) References Cited

U.S. PATENT DOCUMENTS

| | | | |
|---|---|---|---|
| 2017/0342849 A1* | 11/2017 | Rice | F01D 11/005 |
| 2018/0023408 A1* | 1/2018 | Rice | F01D 25/005 |
| | | | 415/173.1 |
| 2018/0149041 A1* | 5/2018 | Freeman | F01D 25/246 |
| 2018/0149042 A1* | 5/2018 | Freeman | F01D 11/005 |
| 2018/0306045 A1 | 10/2018 | Barrett et al. | |
| 2018/0306063 A1* | 10/2018 | Shoemaker | F01D 11/005 |
| 2019/0107002 A1* | 4/2019 | Crutchfield | F01D 25/246 |
| 2020/0080438 A1* | 3/2020 | Walston | F01D 25/005 |
| 2020/0378264 A1* | 12/2020 | Vetters | F01D 25/24 |
| 2021/0025284 A1* | 1/2021 | Sippel | F01D 25/246 |

* cited by examiner

TURBINE SHROUD ASSEMBLY WITH DOVETAIL RETENTION SYSTEM

FIELD OF THE DISCLOSURE

The present disclosure relates generally to gas turbine engines, and more specifically to turbine shroud assemblies for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional arrangements may not allow for the differing levels of expansion and contraction during operation of the gas turbine engine.

SUMMARY

The present disclosure may comprise one or more of the following features and combinations thereof.

According to the present disclosure, a turbine shroud assembly may comprise of a turbine outer case, a connection flange, a blade track segment, and a carrier assembly. The turbine outer case may include an outer wall that extends circumferentially about an axis and a mount flange that extends radially away from the outer wall. The connection flange may extend radially inward relative to the outer wall.

The blade track segment may be made of ceramic matrix composite materials. The blade track segment may include an arcuate runner and an attachment feature. The arcuate runner may extend circumferentially partway around the axis. The attachment feature may extend radially outward from the runner and may further include a radially inward facing angled load surfaces and a radially outward facing locating surface.

The carrier assembly may be made of metallic material and arranged circumferentially partway around the axis. The carrier assembly may comprise a forward carrier segment and an aft carrier segment. The forward carrier segment may include a forward radially extending flange and a forward load carrying portion. The forward radially extending flange may couple with the connection flange. The forward load carrying portion may extend axially aft from an inner end of the forward extending flange and engage with a first of the angled load surfaces of the blade track segment. The aft carrier segment may include a carrier mount, an aft flange, and an aft load carrying portion. The carrier mount may couple with the connection flange. The aft flange may extend radially inward. The aft load carrying portion may extend axially forward from an inner end of the aft flange and engage with a second of the angled load surfaces of the blade track segment.

The forward carrier segment and aft carrier segment may be pressed axially towards each other. This may cause the forward and aft load carrying portions to push the angled load surfaces radially outward resulting in the blade track segment being located relative to the carrier assembly.

In some embodiments, the carrier assembly may include a locating pad that extends radially inward and engage the locating surface of the attachment feature. In another embodiment, the locating pad of the carrier assembly and the locating surface of the attachment feature may be planar surfaces, tangential to the axis.

In a further embodiment, the forward load carrying portion may include radially outward extending forward load pads. The aft load carrying portion may include radially outward extending aft load pads. The forward load pads and aft load pads may engage the angled load surfaces of the attachment feature.

In some embodiments, the turbine outer case may further include an aft turbine case. The connection flange may be a discrete component that is coupled between the mount flange and the aft turbine case. In another embodiment, the connection flange may extend radially inward and extend axially forward and aft to form a panel. An inward radial surface of the panel may form a locating pad that engages the locating surface of the blade track segment.

In other embodiments, the connection flange may include a first attachment feature and a plurality of second attachment features. The first attachment feature may extend circumferentially about the axis. The plurality of second attachment features that extend radially inward from the first attachment feature such that the second attachment features are circumferentially spaced apart from one another.

In another embodiment, the first attachment feature may be coupled with the turbine outer case. The forward and aft carrier segments may be coupled to at least one of the plurality of second attachment features.

According to another aspect of the present disclosure, a turbine shroud assembly may comprise a turbine outer case, a connection flange, a blade track segment, and a carrier assembly. The turbine outer case may have an outer wall arranged around an axis. The connection flange may be coupled for movement with the outer wall and extend radially inward relative to the outer wall. The blade track segment may include and arcuate runner and an attachment feature. The arcuate runner may extend circumferentially partway around the axis. The attachment feature may extend radially outward from the runner and include a first radially inward facing angled load surface and a second radially inward facing angled load surface. The first and second radially inward facing angled load surfaces may converge toward each other.

The carrier assembly may be arranged circumferentially partway around the axis. The carrier assembly may comprise a forward carrier segment and an aft carrier segment coupled with the connection flange for movement therewith. The forward carrier segment may engage the first radially inward facing angled load surface. The aft carrier segment may engage the second radially inward facing angled load surface so that the carrier assembly supports the blade track segment radially relative to the axis. The forward carrier segment and the aft carrier segment may be clamped together in compression so that the blade track segment does not move radially relative to the axis in response to thermal growth of the turbine shroud assembly.

In some embodiments, the forward carrier segment and the aft carrier segment may apply a radial compression force to the attachment feature. In another embodiment, the connection flange and the outer wall are integrally formed as a single, one-piece component.

In other embodiments, the forward carrier segment may include a forward radially extending flange and an angled forward load carrying portion. The forward radially extending flange may couple with the connection flange. The angled forward load carrying portion may extend axially aft from the forward extending flange and engage the first angled load surface of the blade track segment. The aft carrier segment may include an aft radially extending flange and an angled aft load carrying portion. The aft radially extending flange may couple with the connection flange. The angled aft load carrying portion may extend axially forward and engage the second angled load surface of the blade track segment.

In some embodiments, the first angled load surface, the second angled load surface, the angled forward load carrying portion, and the angled aft load carrying portion may extend in a linear direction. In another embodiment, the arcuate runner and the attachment feature may be formed such that the blade track segment has an I-beam shaped cross-section when viewed circumferentially relative to the axis.

In other embodiments, the connection flange may extend radially inward between the forward and aft carrier segments. The connection flange may engage a radial outer surface of the attachment feature included in the blade track such that the blade track segment is in compression between the forward carrier segment, the aft carrier segment, and the connection flange.

In another embodiment, the turbine outer case may include a forward outer case and an aft outer case. The connection flange may be located axially between the forward outer case and the aft outer case. The forward outer case, the aft outer case, and the connection flange may be fastened together. In some embodiments, the connection flange is a single-piece component that extends circumferentially about the axis to form a full hoop.

According to another aspect of the present disclosure, a method may provide a turbine outer case may have an outer wall, a connection flange, a blade track segment, and a carrier assembly. The outer wall may be arranged around an axis. The connection flange may be coupled with the outer wall of the turbine outer case. The blade track segment may have an arcuate runner and an attachment feature that extends radially outward away from the arcuate runner. The carrier assembly may comprise a first carrier segment and a second carrier segment. The method may align the connection flange with the first and second carrier segments. The method may align the attachment feature of the blade track segment with the first carrier segment and the second carrier segment. The first carrier segment and the second carrier segment may be moved relative to each other to trap the attachment feature between the first carrier segment and the second carrier segment so that load carrying portions included in the first carrier segment and the second carrier segment engage radially inward facing and angled load surfaces of the attachment feature and move the radially inward facing and angled load surfaces radially outward. The first carrier segment and the second carrier segment may be coupled with the connection flange.

In a further embodiment, the method may comprise engaging a radially outer surface of the attachment feature with the connection flange. In another embodiment, the load carrying portions included in the first carrier segment and the second carrier segment and the radially inward facing and angled load surfaces of the attachment feature extend along a linear path.

These and other features of the present disclosure will become more apparent from the following description of the illustrative embodiments.

DETAILED DESCRIPTION OF THE DRAWINGS

Figure 1:
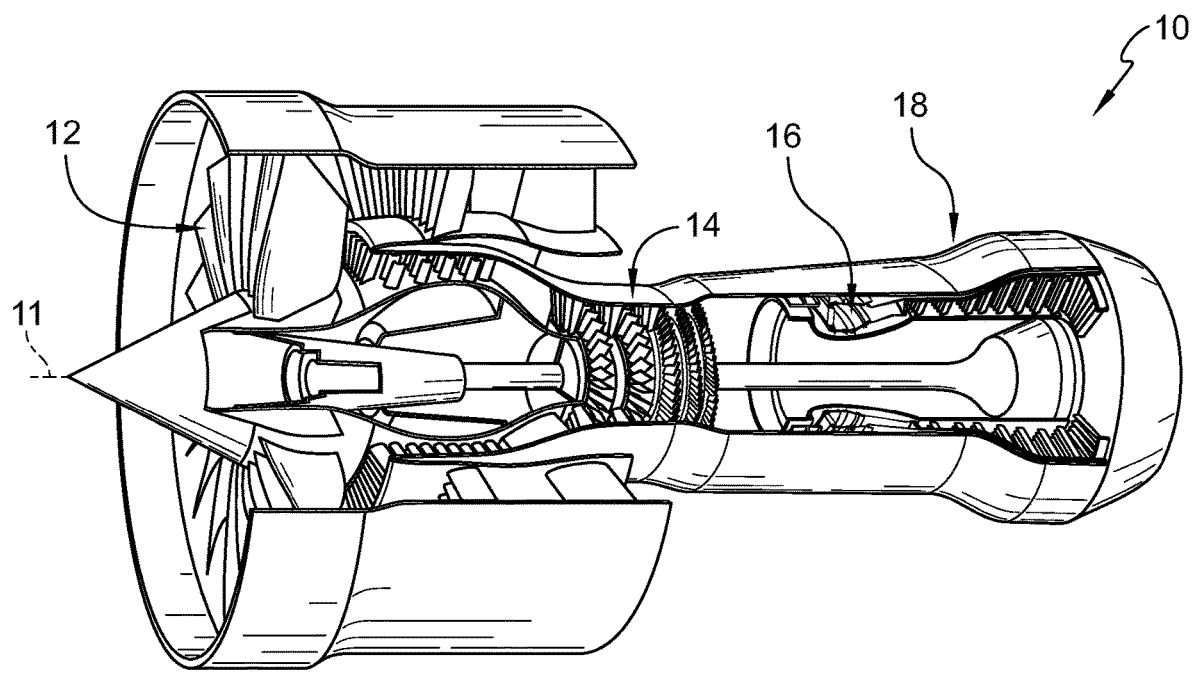
FIG. 1 is a cutaway perspective view of a gas turbine engine that includes a fan, a compressor, a combustor, and a turbine, the turbine includes a turbine shroud assembly that extends circumferentially around an axis and circumferentially around a turbine wheel that is driven to rotate about the axis of the engine to generate power.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan 12 may be replaced with a propeller, drive shaft, or other suitable configuration.

Figure 2:
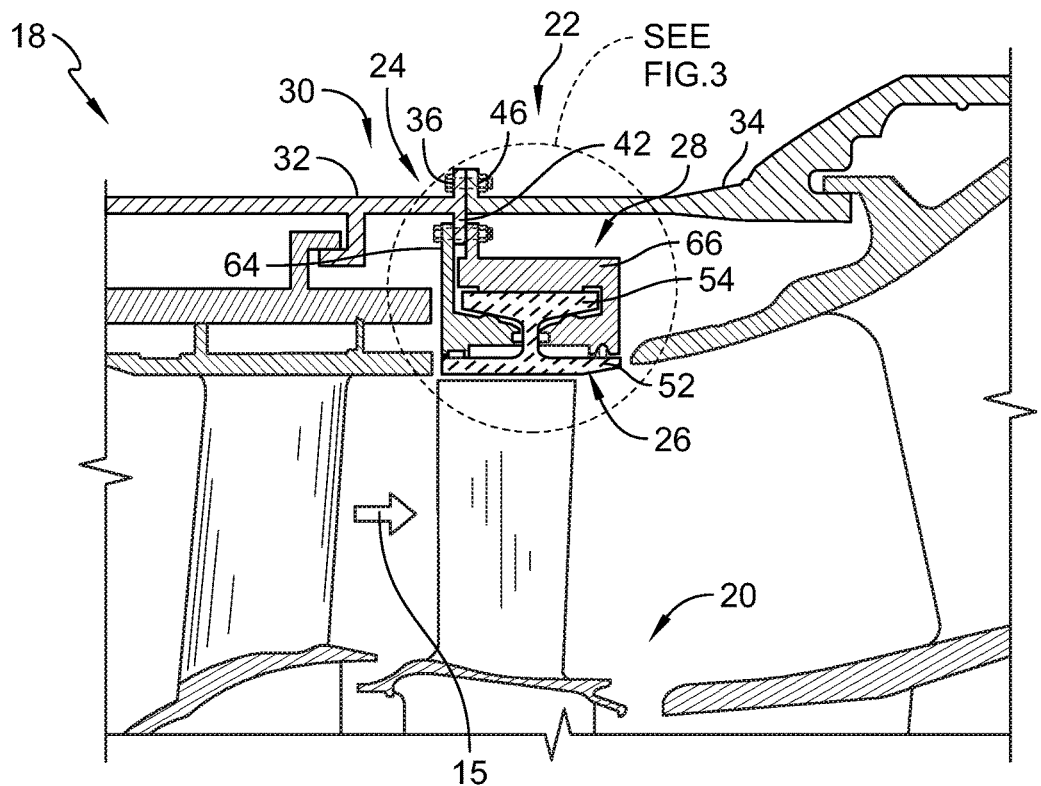
FIG. 2 is a cross-sectional view of a portion of the turbine included in the gas turbine engine of FIG. 1 showing one of the turbine wheel assemblies and the turbine shroud arranged around the turbine wheel assembly, the turbine shroud including a blade track segment with a dovetail attachment feature and a carrier assembly comprising a forward segment and aft carrier segment, wherein the forward and aft carrier segments create a dovetail cavity that receives the dovetail attachment feature of the blade track segment.

The turbine 18 includes a turbine wheel assembly 20 and a turbine shroud assembly 22 positioned to surround the turbine wheel assembly 20 as shown in FIG. 2. The turbine shroud assembly 22 extends circumferentially about the engine axis 11 and defines a gas path 15 outer boundary through which hot, high-pressure combustion products can flow. The turbine shroud assembly 22 includes a turbine outer case 24, a blade track segment 26 that forms the boundary with the gas path 15, a carrier assembly 28 that couples the blade track segment 26 with the turbine outer case 24, and a mounting system 30 as shown in FIG. 2. The mounting system 30 of the turbine shroud assembly 22 is configured to radially locate the blade track segment 26 relative to the turbine outer case 24, by engaging locating surfaces on the carrier assembly 28 and blade track segment 26.

The carrier assembly 28 comprises metallic support components configured to interface with other metallic components spaced apart from the gas path. Illustratively, the carrier assembly 28 is segmented and extends circumferentially partway around the axis 11. The blade track segments 26 are ceramic matrix composite components configured to directly face the high temperatures of the gas path 15.

Figure 3:
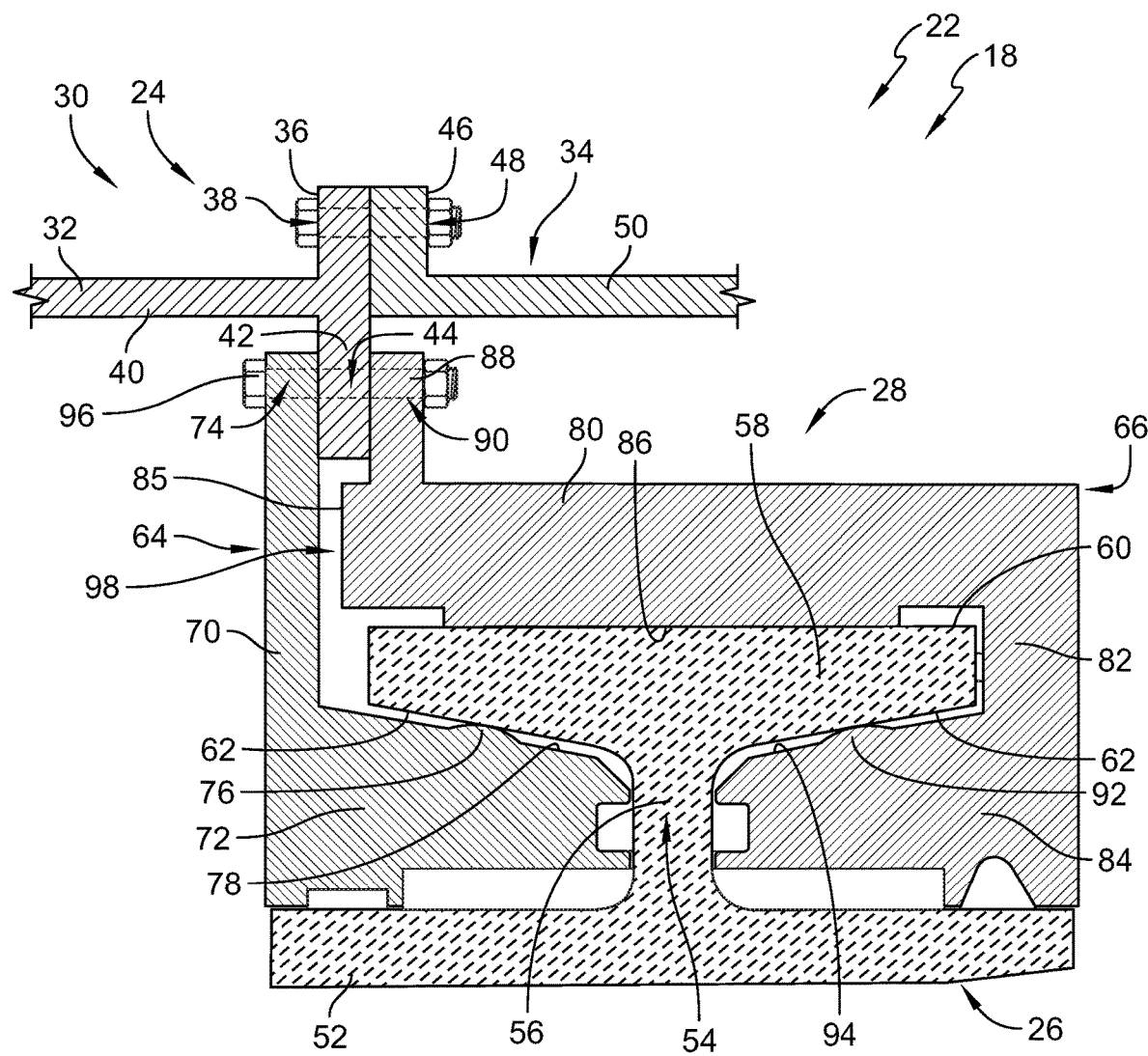
FIG. 3 is a detailed view of a portion of FIG. 2 showing that the forward and aft carrier segments assemble axially toward each other so that the angled surfaces push the dovetail attachment feature radially outward so that a flat outer radial surface of the dovetail feature locates against a locating pad on the aft carrier segment to radially position the blade track relative to the carrier assembly, and mount flanges on the forward and aft carrier segments couple to a turbine case connection flange that extends radially inward from the outer wall.

The turbine outer case 24 includes a forward outer case 32 and an aft outer case 34 as shown in FIGS. 2 and 3. The forward outer case 32 extends axially forward and can form the outer case of forward sections of the turbine 18 and/or assemble to forward sections of the gas turbine engine 10, such as the combustor 16. The aft outer case 34 extends axially aft and can form the outer case of an aft section of the turbine 18 and/or assemble to aft sections of the gas turbine engine 10, such as a low pressure turbine section.

The forward outer case 32 includes a mount flange 36, an outer wall 40, and a connection flange 42 that engages the carrier assembly 28 as shown in FIGS. 2 and 3. The mount flange 36 extends radially outward from an aft terminating end of the outer wall 40 and includes forward assembly holes 38 that extend axially through the mount flange 36 and are equally spaced apart in the circumferential direction. The outer wall 40 extends axially forward from the mount flange 36 and extends circumferentially around the engine axis 11 to form a full hoop. The connection flange 42 extends radially inward from the aft terminating end of the outer wall 40 and the mount flange 36. The connection flange 42 includes connection flange assembly holes 44 that extend axially through a radially inward portion of the connection flange 42 and are equally spaced apart in the circumferential direction. In other embodiments, the connection flange 42 can be axially forward of the aft terminating end of the outer wall 40 and mount flange 36. The connection flange 42 is integrally formed with the outer wall 40 and mount flange 36 to provide an integral, single-piece component.

The aft outer case 34 includes a mount flange 46 and an outer wall 50 as shown in FIGS. 2 and 3. The mount flange 46 extends radially outward from a forward terminating end of the outer wall 50 and includes aft assembly holes 48 that extend axially through the mount flange 46 and are equally spaced apart in the circumferential direction. The aft assembly holes 48 are positioned radially and circumferentially to align with the forward assembly holes 38 of the forward outer case 32. The outer wall 50 extends axially aft from the mount flange 46 and extends circumferentially around the engine axis 11 to form a full hoop. Fasteners extend through the holes 38, 48 to couple the forward outer case 32 with the aft outer case 34.

Figure 4:
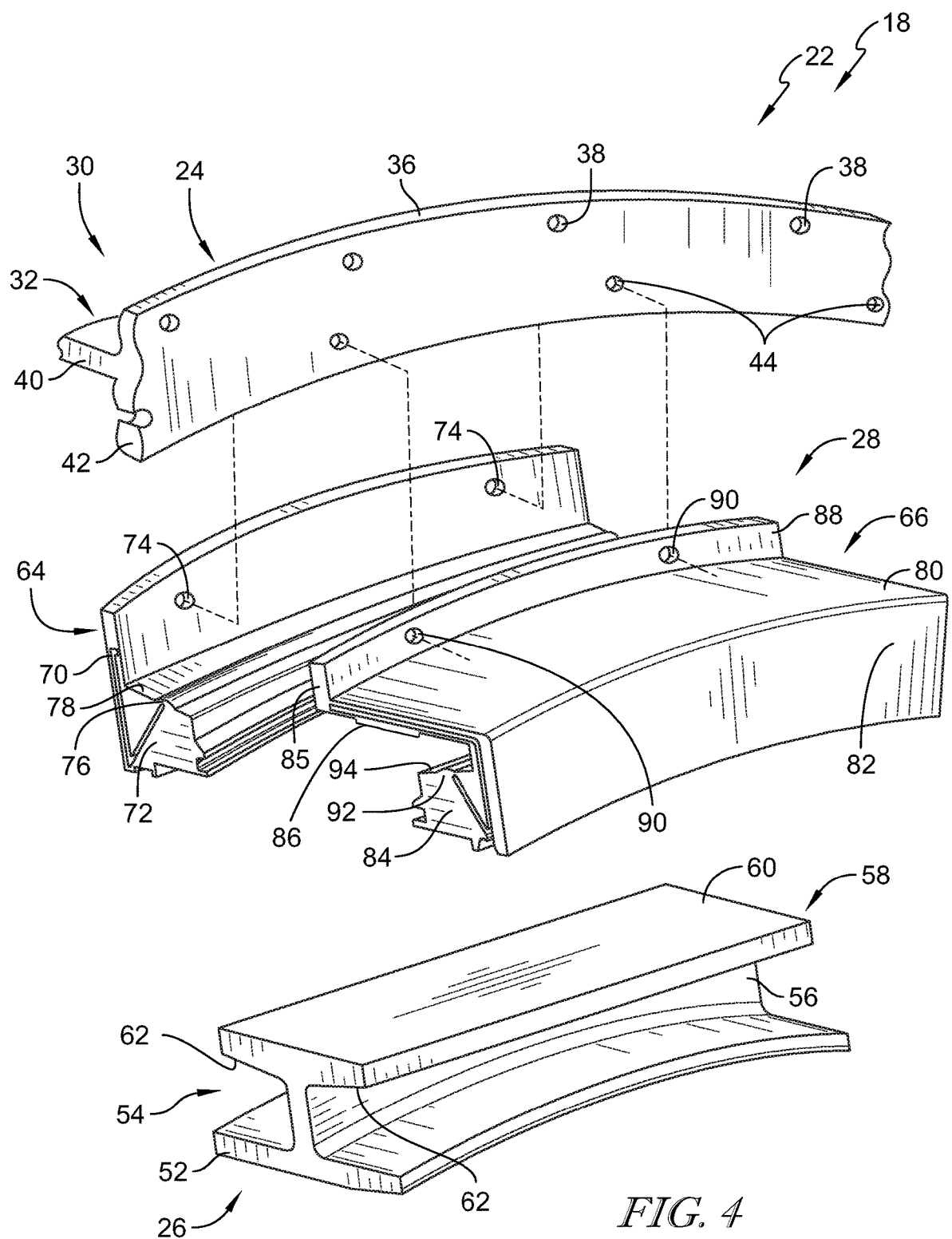
FIG. 4 is an exploded perspective view of the turbine shroud assembly of FIG. 3.

Each blade track segment 26 extends circumferentially partway around the engine axis 11 and forms the outer surface of the gas path 15 as shown in FIGS. 2 and 3. The blade track segment 26 includes a runner 52 and a dovetail attachment feature 54 as shown in FIGS. 3 and 4. The runner 52 is arcuate and extends circumferentially partway around the engine axis 11 and extends a limited axial distance across the engine axis 11. The dovetail attachment feature 54 extends radially outward from the runner 52 to provide structure for coupling the blade track segment 26 to the carrier assembly 28.

The dovetail attachment feature 54 includes a stem 56 that extends radially outward from the runner 52 and a head 58 that extends in a linear path when viewed circumferentially and has a dovetail shape cross-section as shown in FIGS. 3 and 4. The dovetail attachment feature 54 extends circumferentially across the runner 52 of the blade track segment 26. The head 58 includes a locating surface 60 on the outer portion and load retainer surfaces 62 on the angled inner portions of the dovetail shape. Both the locating surface 60 and load retainer surfaces 62 are linear and provide flat surfaces for engaging with the corresponding features of the carrier assembly 28. The surfaces 62 are angled relative to an imaginary radial spoke from the axis 11 and converge toward each other.

The carrier assembly 28 includes a forward carrier segment 64 and an aft carrier segment 66 positioned axially aft of the forward carrier segment 64 as shown in FIG. 3. The forward carrier segment 64 engages a forward portion of the connection flange 42 of the forward outer case 32 and assembles around a forward portion of the dovetail attachment feature 54. The aft carrier segment 66 engages an aft portion of the connection flange 42 of the forward outer case 32 and assembles around an outer portion and aft portion of the dovetail attachment feature 54.

The forward carrier segment 64 includes a radial extending flange 70 and a forward load carrying portion 72 that extends axially aft from a radially inward portion of the radial extending flange 70 as shown in FIG. 3. The radial extending flange 70 is positioned axially forward of the connection flange 42 and includes forward carrier assembly holes 74 that extend axially through a radially outer portion of the radial extending flange 70. The forward carrier assembly holes 74 are equally spaced apart circumferentially and are positioned radially and circumferentially to align with the connection flange assembly holes 44 of the forward outer case 32. The radial extending flange 70 extends radially inward towards the runner 52 of the blade track segment 26 and maintains a small gap therebetween.

The forward load carrying portion 72 extends axially aft from the radial extending flange 70 and locates radially inward of the forward portion of the head 58 and radially outward of the runner 52 as shown in FIG. 3. The forward load carrying portion 72 includes a forward load pad 76 and a forward retainer surface 78 that are both linear and face outwardly toward the forward load retainer surface 62 of the dovetail attachment feature 54. The forward load pad 76 extends outward perpendicularly from the forward retainer surface 78 and has a curved surface. The forward load pad 76 engages with the load retainer surface 62 of the dovetail attachment feature 54. In the illustrative embodiment the forward load carrying portion 72 includes seal grooves that face the stem 56 and runner 52 to discourage air flow therebetween. The illustrative seal grooves may also include rope seals to seal between the forward load carrying portion 72 and the blade track segment 26.

The aft carrier segment 66 includes a carrier outer wall 80, an aft flange 82, and an aft load carrying portion 84 as shown in FIG. 3. The carrier outer wall 80 is located radially outward of the head 58 and includes a locating pad 86 and a carrier mount flange 88 that is positioned axially aft of the connection flange 42. The carrier mount flange 88 extends radially outward from a forward terminating end 85 of the carrier outer wall 80 and includes aft carrier assembly holes 90 that extend axially through the carrier mount flange 88. The aft carrier assembly holes 90 are equally spaced apart circumferentially and align radially and circumferentially with the connection flange assembly holes 44 of the forward outer case 32 and the forward carrier assembly holes 74 of the forward carrier segment 64.

The locating pad 86 is linear and is located on the radially inner surface the carrier outer wall 80. The carrier outer wall 80 is arcuate in the illustrative embodiment. In a further embodiment, the carrier outer wall 80 may be linear. The locating pad 86 engages the locating surface 60 of the blade track segment 26 during assembly to radially locate the blade track segment 26 relative to the carrier assembly 28. In the illustrative embodiment, the locating pad 86 and locating surface 60 provide a flat-to-flat contact engagement surface.

In another embodiment, the forward carrier segment 64 may include a forward outer wall and a forward flange. The forward outer wall may extend axially forward from the radially extending flange 70. The forward outer wall may include the locating pad 86 that engages locating surface 60 of the blade track segment 26. The forward flange may extend radially inward from a forward terminating end of the forward outer wall, and the forward load carrying portion 72 may extend axially aft from a radially inner end of the forward flange.

The aft flange 82 extends radially inward from an aft terminating end of the carrier outer wall 80 toward the runner 52 of the blade track segment 26 and maintains a small gap therebetween as shown in FIG. 3. The aft load carrying portion 84 extends axially forward from the aft flange 82 and locates radially inward of an aft portion of the head 58 and radially outward of the runner 52. The aft load carrying portion 84 includes an aft load pad 92 and an aft retainer surface 94 that are both linear and face outwardly toward the aft load retainer surface 62 of the dovetail attachment feature 54. The aft load pad 92 extends outward perpendicularly from the aft retainer surface 94 and has a curved surface. The aft load pad 92 engages the load retainer surface 62 of the dovetail attachment feature 54. In the illustrative embodiment the aft load carrying portion 84 includes seal grooves that face the stem 56 and runner 52 to discourage air flow therebetween. The illustrative seal grooves may also include rope seals to seal between the aft load carrying portion 84 and the blade track segment 26.

The mounting system 30 includes assembly bolts 96 and an assembly gap 98 that closes during assembly to bias the locating surface 60 of the blade track segment 26 into engagement with the locating pad 86 of the aft carrier segment 66 of the carrier assembly 28. Prior to clamping the turbine shroud assembly 22 together, an assembly gap 98 is present axially between the radial extending flange 70 of the forward carrier segment 64 and the forward terminating end 85 of the carrier outer wall 80 of the aft carrier segment 66. The assembly bolts 96 clamp the radial extending flange 70, the connection flange 42, and the carrier mount flange 88 together through the forward carrier assembly holes 74, the connection flange assembly holes 44, and the aft carrier assembly holes 90.

As the assembly bolts 96 are tightened, the connection flange 42 is compressed and the forward carrier segment 64 and the aft carrier segment 66 axially move closer together reducing the axial distance of the assembly gap 98. As the forward carrier segment 64 moves axially aft, the forward load carrying portion 72 and forward load pad 76 translate axially aft and push on the load retainer surface 62 of the dovetail attachment feature 54. At the same time, the aft carrier segment 66 translates axially forward and the aft load carrying portion 84 and the aft load pad 92 translate forward to push on the load retainer surface 62 of the dovetail attachment feature 54.

The axially aft movement of the forward load pad 76 on the forward portion of the angled load retainer surface 62, and the axially forward movement of the aft load pad 92 on the aft portion of the angled load retainer surface 62 bias the head 58 of the dovetail attachment feature 54 radially outward. The assembly gap 98 continues to axially reduce until the locating surface 60 of the dovetail attachment feature 54 engages the locating pad 86 of the aft carrier segment 66. The assembly gap 98 is sized to maintain an axial gap after the locating surface 60 has engaged the locating pad 86.

Figure 5:
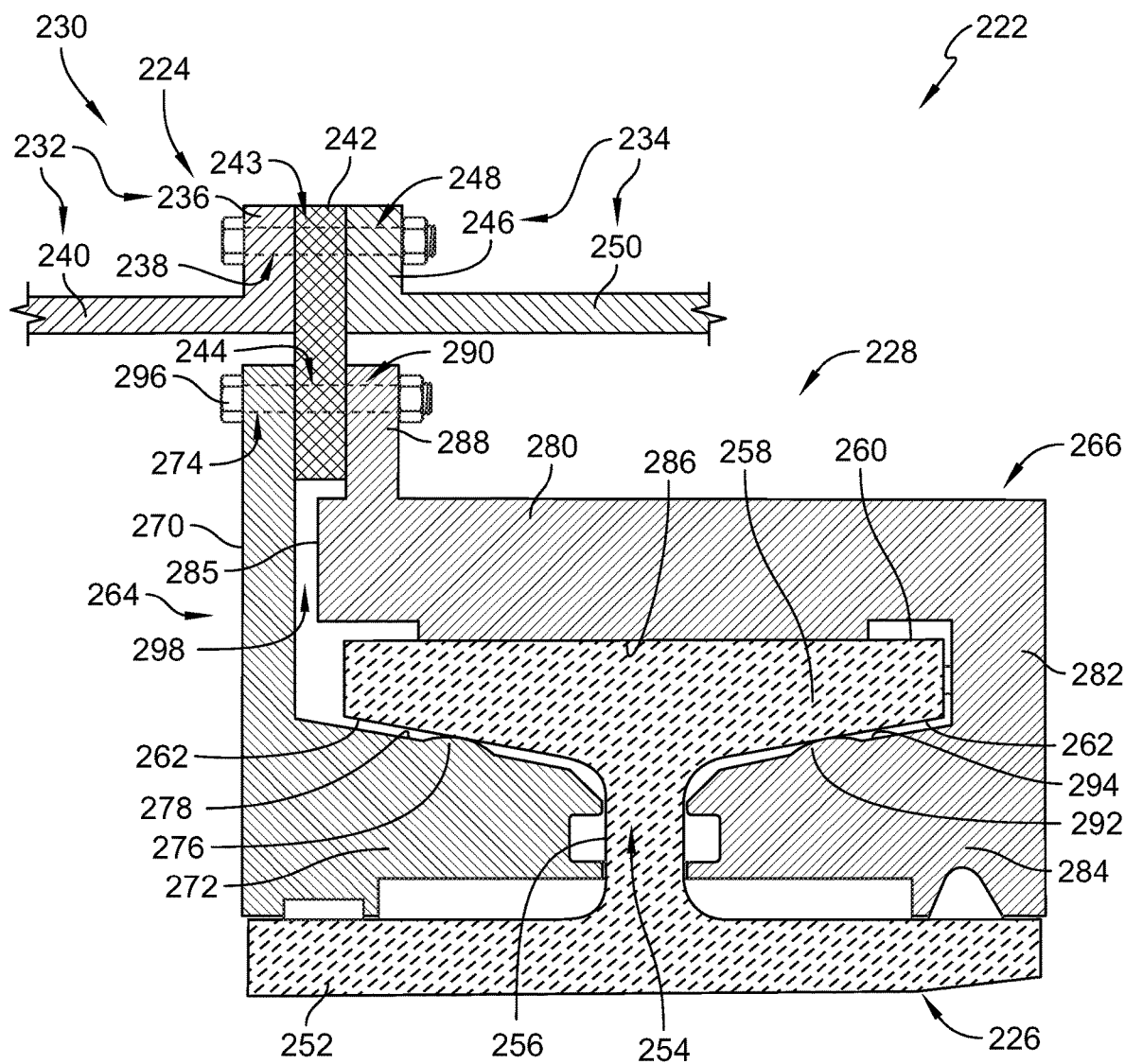
FIG. 5 is a detailed view of a second turbine shroud assembly adapted for use with the gas turbine engine of FIG. 1 with a similar forward and aft carrier arrangement as the turbine shroud of FIG. 3 showing that the second turbine shroud assembly includes forward and aft carrier segments coupled to a radially inward portion of a discrete connection flange, and the discrete connection flange couples to the turbine outer case at a radially outer portion the connection flange.
Figure 6:
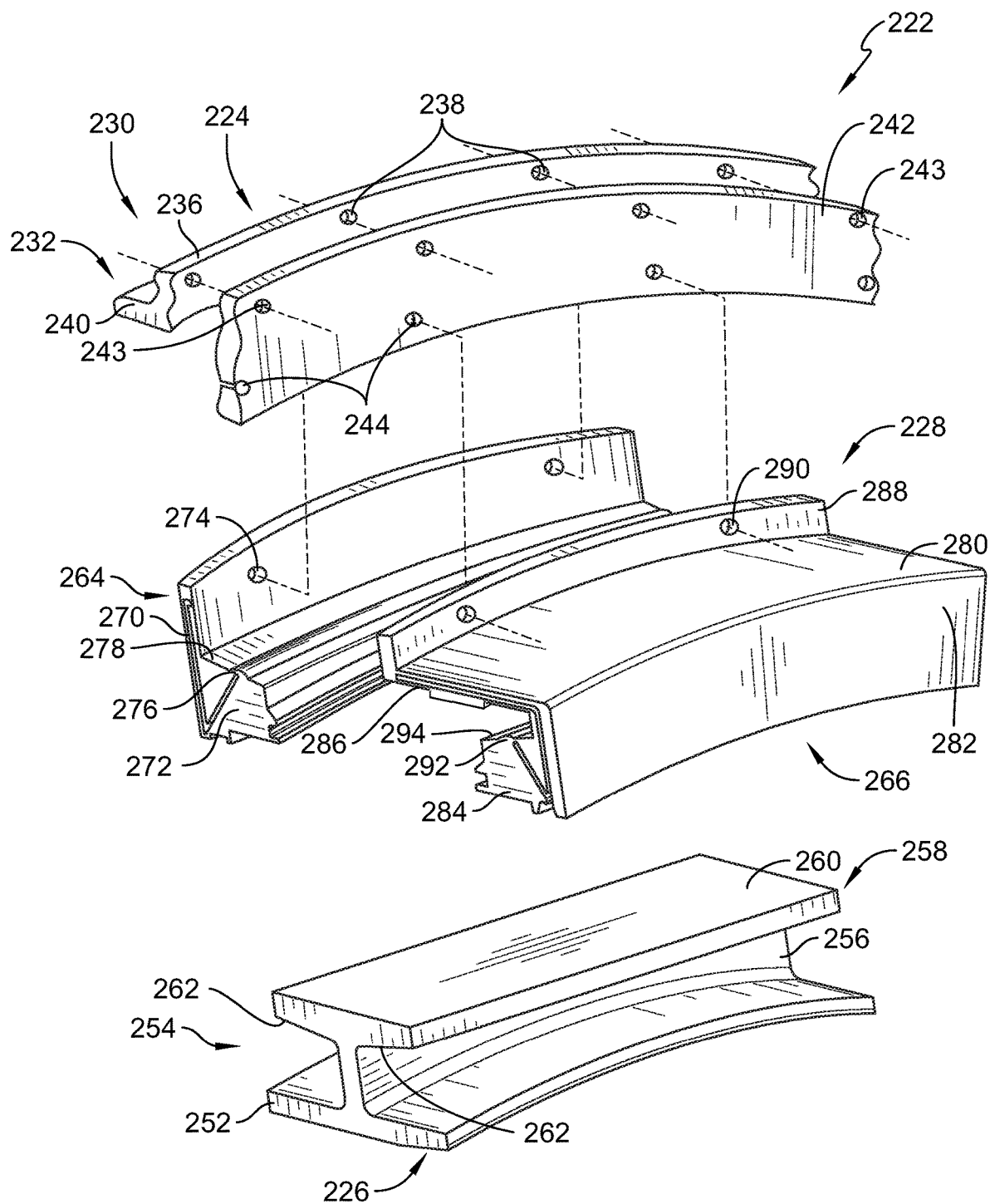
FIG. 6 is an exploded perspective view of the turbine shroud assembly of FIG. 5.

Another embodiment of a turbine shroud assembly 222 in accordance with the present disclosure is shown in FIGS. 5 and 6. The turbine shroud assembly 222 is substantially similar to the turbine shroud assembly 22 shown in FIGS. 1-4 and described herein. Accordingly, similar reference numbers in the 200 series indicate features that are common between the turbine shroud assembly 222 and the turbine shroud assembly 22. The description of the turbine shroud assembly 22 is incorporated by reference to apply to the turbine shroud assembly 222, except in instances when it conflicts with the specific description and the drawings of the turbine shroud assembly 222.

The turbine shroud assembly 222 includes a turbine outer case 224, a blade track segment 226, a carrier assembly 228, a mounting system 230, and connection flange 242 that couples the carrier assembly 228 to the turbine outer case 224 as shown in FIGS. 5 and 6. The turbine outer case 224 includes a forward outer case 232 and an aft outer case 234. The forward outer case 232 includes an outer wall 240 and a mount flange 236 that extends radially outward from an aft terminating end of the outer wall 240. The mount flange 236 includes forward assembly holes 238 that extend axially through the mount flange 236 and are equally spaced apart in the circumferential direction. The aft outer case 234 includes an outer wall 250 and a mount flange 246 that extends radially outward from a forward terminating end of the outer wall 250. The mount flange 246 includes aft assembly holes 248 that extend axially through the mount flange 246 and align with the forward assembly holes 238 of the forward outer case 232.

The connection flange 242 is a discrete component that assembles at an outer portion between the forward outer case 232 and the aft outer case 234, and assembles at an inner portion between the forward carrier segment 264 and the aft carrier segment 266 as shown in FIG. 5. The connection flange 242 extends a short distance axially and extends circumferentially around the engine axis 11 to form a full hoop. The connection flange includes outer assembly holes 243 at the outer portion of the connection flange 242 and carrier assembly holes 244 at the inner portion of the connection flange 242. The outer assembly holes 243 extend axially through the connection flange 242 and align radially and circumferentially with the forward assembly holes 238 and the aft assembly holes 248. The carrier assembly holes 244 extend axially through the connection flange 242 and are equally spaced in the circumferential direction.

The blade track segment 226 includes a runner 252 and a dovetail attachment feature 254 as shown in FIGS. 5 and 6. The dovetail attachment feature 254 includes a stem 256 that extends radially outward from the runner 252 and a head 258 coupled to the outward portion of the stem 256. The head 258 includes a locating surface 260 on the outer portion and load retainer surfaces 262 on the angled inner portions of the dovetail shape.

The carrier assembly 228 includes a forward carrier segment 264 and an aft carrier segment 266 as shown in FIG. 5. The forward carrier segment 264 includes a radial extending flange 270 and a forward load carrying portion 272 that extends axially aft from a radially inward portion of the radial extending flange 270. The radial extending flange 270 is positioned axially forward of the connection flange 242 and includes forward carrier assembly holes 274 that extend axially through a radially outward portion of the radial extending flange 270. The forward carrier assembly holes 274 align with the carrier assembly holes 244 of the connection flange 242. The forward load carrying portion 272 includes a forward retainer surface 278 and a forward load pad 276 that extends outward perpendicularly from the forward retainer surface 278.

The aft carrier segment 266 includes a carrier outer wall 280, an aft flange 282, and an aft load carrying portion 284 as shown in FIG. 5. The carrier outer wall 280 is located radially outward of the head 258 and includes a locating pad 286, a forward terminating end 285, and a carrier mount flange 288 that is positioned axially aft of the connection flange 242. The carrier mount flange 288 extends radially outward from the carrier outer wall 280 and includes aft carrier assembly holes 290 that extend axially through the carrier mount flange 288. The aft carrier assembly holes 290 align radially and circumferentially with the carrier assembly holes 244 of the connection flange 242. The locating pad 286 is linear and is located on the radially inner surface the carrier outer wall 280. The aft flange 282 extends radially inward from an aft terminating end of the carrier outer wall 280 and the aft load carrying portion 284 extends axially forward from an inner portion of the aft flange 282. The aft load carrying portion 284 includes an aft retainer surface 294 and an aft load pad 292 that extends outward perpendicularly from the aft retainer surface 294. The aft load pad 292 engages the load retainer surface 262 of the dovetail attachment feature 254.

The mounting system 230 includes assembly bolts 296 and an assembly gap 298 that closes during assembly to bias the locating surface 260 of the blade track segment 226 into engagement with the locating pad 286 of the carrier assembly 228. Prior to clamping the turbine shroud assembly 222 together, an assembly gap 298 is present axially between the radial extending flange 270 of the forward carrier segment 264 and the forward terminating end 285 of the aft carrier segment 266. The assembly bolts 296 extend through forward carrier assembly holes 274, the carrier assembly holes 244, and the aft carrier assembly holes 290 to clamp the forward carrier segment 264, the connection flange 242, and the aft carrier segment 266 together.

As the assembly bolts 296 are tightened, the connection flange 242 is compressed and the forward carrier segment 264 and the aft carrier segment 266 axially move closer together, reducing the axial distance of the assembly gap 298. The aft axial movement of the forward carrier segment 264 and the forward axial movement of the aft carrier segment 266 result in the forward and aft load pads 276, 292 to push against the angled load retainer surfaces 262 of the blade track segment 226. This results in biasing the head 258 of the dovetail attachment feature 254 radially outward. The assembly gap 298 continues to axially reduce until the locating surface 260 of the blade track segment 226 engages the locating pad 286 of the carrier assembly 228.

Figure 7:
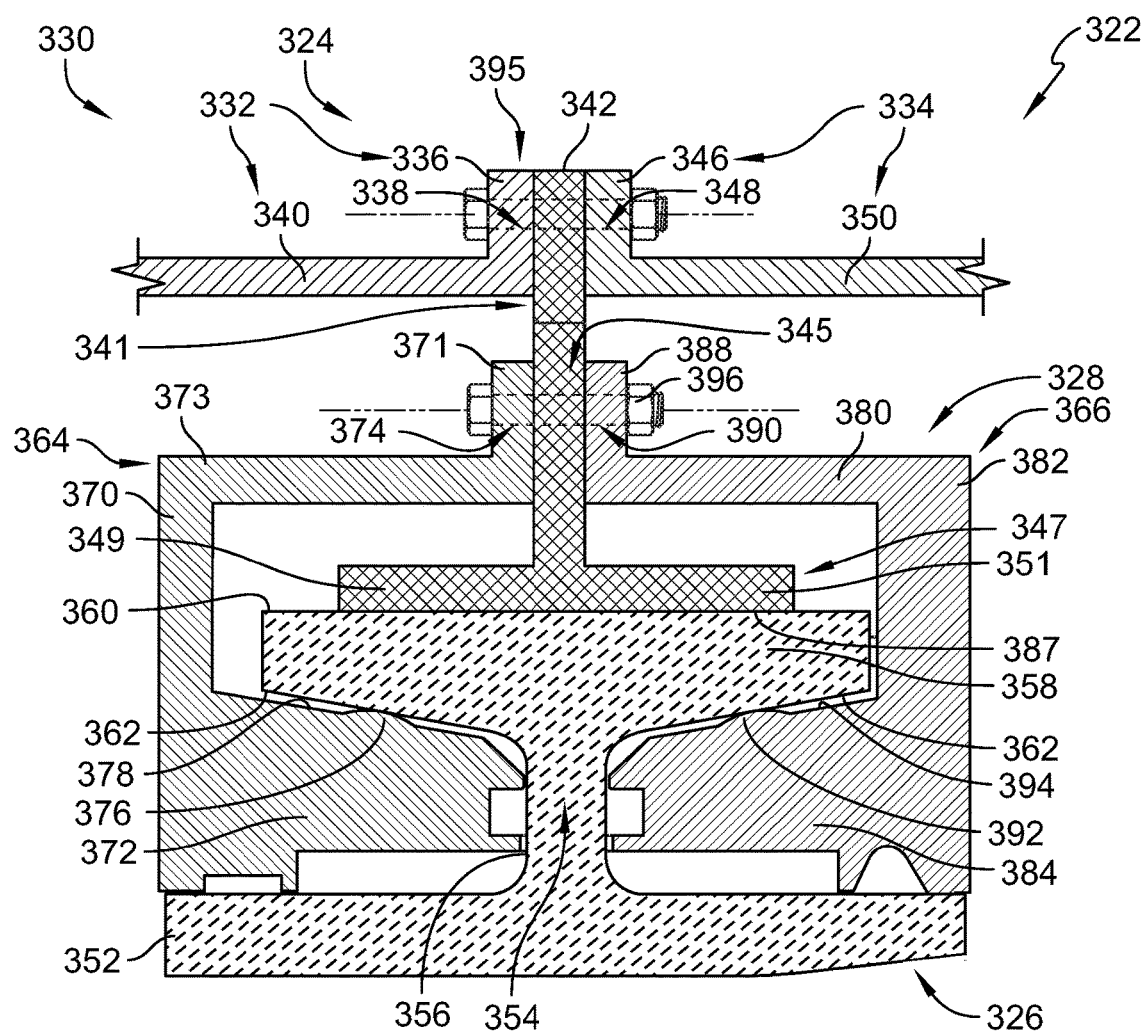
FIG. 7 is a detailed view of a third turbine shroud assembly adapted for use with the gas turbine engine of FIG. 1 showing a connection flange having a radially outward portion that couples to the turbine outer case, a mid-portion that couples to the mount flanges of the carrier segments, and a radially inner portion that extends axially forward and aft to form a T-shape cross-section that comprises a locating panel on the inner radial surface, and the locating panel engages the locating surface of the dovetail attachment feature to radially position the blade track relative to the turbine outer case.
Figure 8:
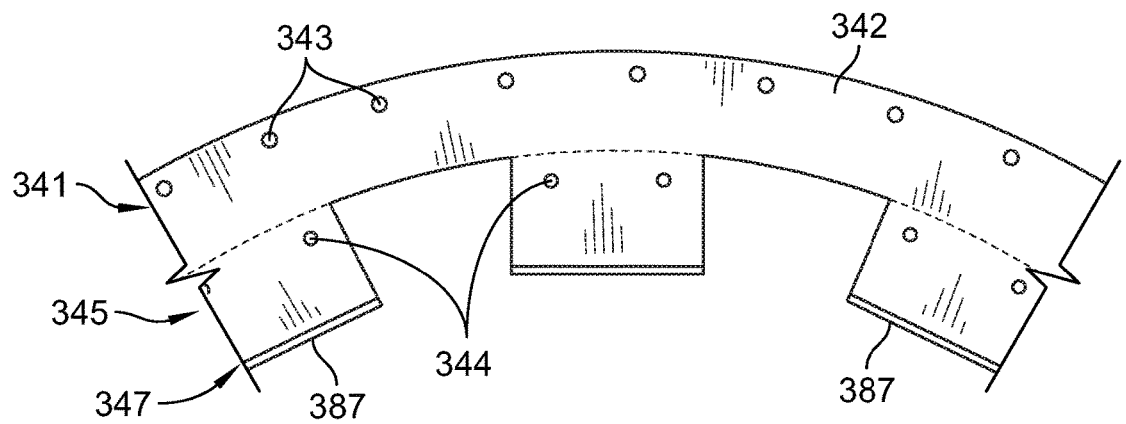
FIG. 8 is an aft elevation view of a portion of the connection flange of FIG. 7.
Figure 9:
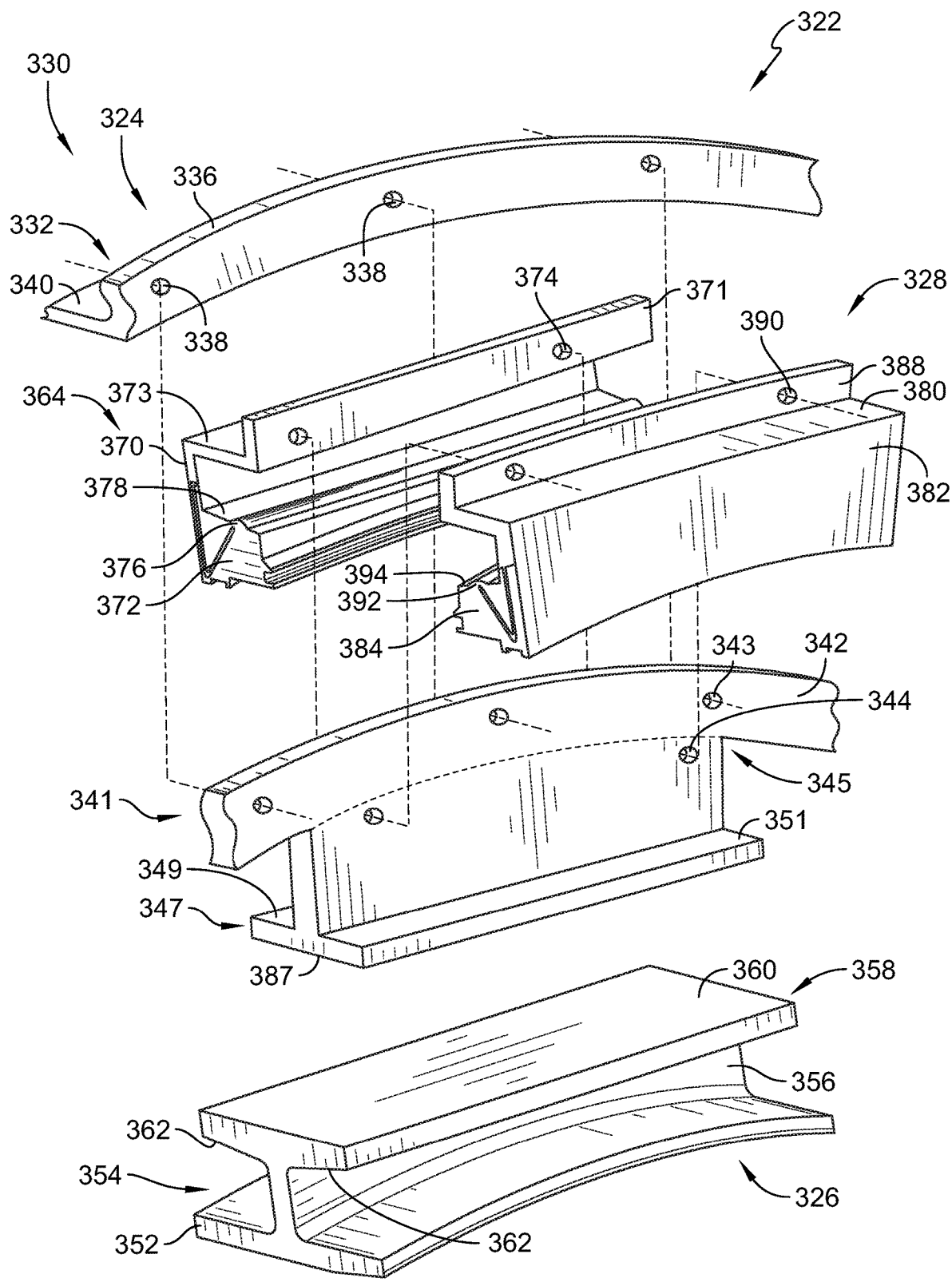
FIG. 9 is an exploded perspective view of the turbine shroud assembly of FIG. 7.

Another embodiment of a turbine shroud assembly 322 in accordance with the present disclosure is shown in FIGS. 7-9. The turbine shroud assembly 322 is substantially similar to the turbine shroud assembly 22 shown in FIGS. 1-4 and described herein. Accordingly, similar reference numbers in the 300 series indicate features that are common between the turbine shroud assembly 322 and the turbine shroud assembly 22. The description of the turbine shroud assembly 22 is incorporated by reference to apply to the turbine shroud assembly 322, except in instances when it conflicts with the specific description and the drawings of the turbine shroud assembly 322.

The turbine shroud assembly 322 includes a turbine outer case 324, a blade track segment 326, a carrier assembly 328, a mounting system 330, and connection flange 342 that couples the carrier assembly 328 to the turbine outer case 324 and radially locates the blade track segment 326 relative to the turbine outer case 324 as shown in FIG. 7. The turbine outer case 324 includes a forward outer case 332 and an aft outer case 334. The forward outer case 332 includes an outer wall 340 and a mount flange 336 that extends radially outward from an aft terminating end of the outer wall 340. The mount flange 336 includes forward assembly holes 338 that extend axially through the mount flange 336 and are equally spaced apart in the circumferential direction. The aft outer case 334 includes an outer wall 350 and a mount flange 346 that extends radially outward from a forward terminating end of the outer wall 350. The mount flange 346 includes aft assembly holes 348 that extend axially through the mount flange 346 and align with the forward assembly holes 338 of the forward outer case 332.

The blade track segment 326 includes a runner 352 and a dovetail attachment feature 354 as shown in FIGS. 7 and 9. The dovetail attachment feature 354 includes a stem 356 that extends radially outward from the runner 352 and a head 358 coupled to the outward portion of the stem 356. The head 358 includes a locating surface 360 on the outer portion and load retainer surfaces 362 on the angled inner portions of the dovetail shape.

The carrier assembly 328 includes a forward carrier segment 364 and an aft carrier segment 366 as shown in FIGS. 7 and 9. The forward carrier segment 364 includes a forward mount flange 371, a forward outer wall 373, a forward flange 370, and a forward load carrying portion 372 that extends axially aft from a radially inward portion of the forward flange 370. The forward mount flange 371 couples to the connection flange 342 and includes forward carrier assembly holes 374 that extend axially through the forward mount flange 371. The forward carrier assembly holes 374 are equally spaced apart circumferentially. The forward outer wall 373 extends axially forward from an inner terminating end of the forward mount flange 371. The forward flange 370 extends radially inward from a forward terminating end of the forward outer wall 373 so that the forward flange 370 is located axially forward of the head 358 of the blade track segment 326. The forward load carrying portion 372 includes a forward retainer surface 378 and a forward load pad 376 that extends outward perpendicularly from the forward retainer surface 378.

The aft carrier segment 366 includes an aft mount flange 388, an aft outer wall 380, an aft flange 382, and an aft load carrying portion 384 that extends axially forward from a radially inward portion of the aft flange 382 as shown in FIG. 7. The aft mount flange 388 couples to the connection flange 342 and includes aft carrier assembly holes 390 that extend axially through the aft mount flange 388. The aft carrier assembly holes 390 align radially and circumferentially with the forward carrier assembly holes 374 of the forward carrier segment 364. The aft outer wall 380 extends axially aft from an inner terminating end of the aft mount flange 388. The aft flange 382 extends radially inward from an aft terminating end of the aft outer wall 380 so that the aft flange 382 is located axially aft of the head 358 of the blade track segment 326. The aft load carrying portion 384 includes an aft retainer surface 394 and an aft load pad 392 that extends outward perpendicularly from the aft retainer surface 394.

The connection flange 342 includes a first attachment feature 341, a second attachment feature 345 that is radially inward of the first attachment feature 341, and a locating panel 347 that is radially inward of the second attachment feature 345 and engages with the blade track segment 326 as shown in FIGS. 7 and 8. The connection flange 342 has an inverted T-shape cross-section with the first and second attachment features 341, 345 extending a short distance axially and extending radially inward from the turbine outer case 324 to the locating panel 347 that extends forward and aft from the inner portion of the second attachment feature 345. The locating panel is located radially outward of the head 358 of the blade track segment 326.

The first attachment feature 341 is located axially between the mount flange 336 of the forward outer case 332 and the mount flange 346 of the aft outer case 334, and extends circumferentially around the axis 11 to form a full hoop. The first attachment feature 341 includes outer assembly holes 343 that extend axially through the first attachment feature 341 and align radially and circumferentially with the forward assembly holes 338 and the aft assembly holes 348.

The second attachment feature 345 extends radially inward from the first attachment feature 341 and is segmented to extend circumferentially a similar distance to the dovetail attachment feature 354 of the blade track segment 326. The second attachment feature 345 is located axially between the forward mount flange 371 of the forward carrier segment 364 and the aft mount flange 388 of the aft carrier segment 366 and includes carrier assembly holes 344. The carrier assembly holes 344 extend axially through the second attachment feature 345 and align radially and circumferentially with the forward carrier assembly holes 374 and the aft carrier assembly holes 390.

The locating panel 347 includes an axially forward extending arm 349, an axially aft extending arm 351, and a locating pad 387 as shown in FIGS. 7 and 9. The axially forward extending arm 349 extends forward from an inner terminating end of the second attachment feature 345. The axially aft extending arm 351 extends aft from an inner terminating end of the second attachment feature 345. In the illustrative embodiment, the axially forward extending arm and the axially aft extending arm are similar lengths and extend axially over a majority of the locating surface 360 of the blade track segment 326. The locating pad 387 is linear and is located on the radially inner surface the locating panel 347.

The mounting system 330 includes turbine outer case assembly bolts 395 and carrier assembly bolts 396 as shown in FIG. 7. The turbine outer case assembly bolts extend through the forward assembly holes 338, the outer assembly holes 343, and the aft assembly holes 348 to couple the forward outer case 332, the first attachment feature 341 of the connection flange 342, and the aft outer case 334 together. The carrier assembly bolts 396 extend through the forward carrier assembly holes 374, the carrier assembly holes 344, and the aft carrier assembly holes 390 to couple the forward carrier segment 364, the connection flange 342, and the aft carrier segment 366 together.

As the carrier assembly bolts 396 are tightened, the connection flange 342 is compressed and the forward carrier segment 364 and the aft carrier segment 366 axially translate toward each other. The aft axial movement of the forward carrier segment 364 and the forward axial movement of the aft carrier segment 366 result in the forward and aft load pads 376, 392 to push against the angled load retainer surfaces 362 of the blade track segment 326. This results in biasing the head 358 of the dovetail attachment feature 354 radially outward. The forward carrier segment 364 and the aft carrier segment 366 continue to axially translate toward each other until the locating surface 360 of the blade track segment 326 engages the locating pad 387 of the connection flange 342.

The present disclosure provides a design for a linear dovetail CMC blade track segment 26 and the carrier assembly 28 that supports it. The blade track segment 26 may be supported and radially located by linear load pads 76, 92 on the carrier assembly 28 that may remain in the same position throughout the operating envelope. The load pads 76, 92 on the carrier assembly 28 may also act as chordal seals; with the appropriate circumferential sealing arrangement, these features could be the primary seals between internal cavities.

In the illustrative embodiment, the blade track segment 26 may have a circumferentially linear dovetail attachment feature 54 that may assemble between a forward carrier segment 64 and an aft carrier segment 66 as shown in FIG. 3. The two carriers 64, 66 may each have a circumferentially linear 'bump' or load pad 76, 92 which the head 58 of the blade track segment 26 would contact. The forward carrier segment 64 may have a radial extending flange 70 and the aft carrier segment 66 may have carrier mount flange 88 to interface with the connection flange 42 of the turbine outer case 24. As the flanges 70, 88 of the carrier assembly 28 are brought together, the connection flange 42 may be compressed.

The assembly bolt 96 may be tightened such that the connection flange 42 may be over-compressed and the turbine shroud assembly 22 may not separate during engine operation (i.e. the over-compression distance may be greater than the thermal growth separation distance). As the carriers 64, 66 may not move relative to one another during engine operation, the load pads 76, 92 on which the seal segment is radially located may also not move. The aft carrier segment 66 may press radially downward on the blade track segment 26, putting the head 58 of the blade track segment 26 in compression, under which the CMC material typically performs well. The blade track segment 26 could be manufactured via 2D layups or 3D weaving.

Bending introduced due to the asymmetric pressure loading across the blade track segment 26 can be disassociated from the stresses induced by the load pads 76, 92. This approach may allow for a generous radius at the retainer surfaces 78, 94 to minimize stress concentrations in this feature without interfering with packaging. Additionally, as the CMC blade track segment 26 and carrier assembly 28 will have different coefficients of thermal expansion, the dovetail angle in the blade track segment 26 and the assembly bolt torque may be tailored for different operating conditions to ensure the carriers do not separate.

Anti-rotation options include, but are not limited to, a radial anti-rotation pin engaged in a slot on the dovetail attachment feature 54 or on the locating surface 60 of the blade track segment 26; a feature (such as a tab) on the carrier assembly 28 end to restrain movement; a feature on the circumferentially adjacent carrier assembly 28 or blade track segment 26; or an axial pin that fits into a groove on the blade track segment 26.

An embodiment of the present disclosure uses a full-hoop plate 242 positioned between and bolted to the segmented forward and aft carriers 264, 266 as shown in FIGS. 5 and 6. The full-hoop plate 242 is also bolted between the forward and aft case flanges 236, 246. The blade track segment 226 would be positioned via the assembly bolts 296. The carrier assembly 228 and full-hoop plate 242 would be over-compressed together to ensure they do not grow apart during engine operation.

A further embodiment may allow for either the forward or aft outer case 32, 34 to have an extension or connection flange 42 that acts as the full-hoop plate 242 between the forward and aft carriers 64, 66.

Another embodiment may allow for the full-hoop plate or connection flange 342 to be comprised of two sections as shown in FIG. 8; the first attachment feature 341 that may be full-hoop, and the second attachment feature 345 that may be segmented with the carrier assembly 328 and blade track segments 326. This may be a single-piece with two different cross sections. The first attachment feature 341 may be a full-hoop plate (similar to the connection flange 242 as shown in FIG. 5) and the segmented second attachment feature 345 and locating panel 347 may act as a compression plate. Radial cuts may separate the second attachment feature 345 and locating panel 347 features from circumferentially adjacent features.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising
  a turbine outer case including an outer wall that extends circumferentially about an axis and a mount flange that extends radially away from the outer wall,
  a connection flange that extends radially inward relative to the outer wall,
  a blade track segment made of ceramic matrix composite materials, the blade track segment including an arcuate runner that extends circumferentially partway around the axis and an attachment feature that extends radially outward from the runner, the attachment feature includes radially inward facing angled load surfaces and a radially outward facing locating surface, and
  a carrier assembly made of metallic material and arranged circumferentially partway around the axis, the carrier assembly comprising a forward carrier segment and an aft carrier segment, the forward carrier segment including a forward radially extending flange that couples with the connection flange and a forward load carrying portion that extends axially aft from an inner end of the forward extending flange and engages with a first of the angled load surfaces of the blade track segment, the aft carrier segment including a carrier mount that couples with the connection flange, an aft flange that extends radially inward, and an aft load carrying portion that extends axially forward from an inner end of the aft flange and engages with a second of the angled load surfaces of the blade track segment,
  wherein the forward carrier segment and aft carrier segment are pressed axially towards each other causing forward and aft load carrying portions to push the angled load surfaces radially outward resulting in the blade track segment being located relative to the carrier assembly.

2. The turbine shroud assembly of claim 1, wherein carrier assembly includes a locating pad that extends radially inward and engages the locating surface of the attachment feature.

3. The turbine shroud assembly of claim 2, wherein the locating pad of the carrier assembly and the locating surface of the attachment feature are planar surfaces, tangential to the axis.

4. The turbine shroud assembly of claim 2, wherein the forward load carrying portion includes radially outward extending forward load pads and the aft load carrying portion includes radially outward extending aft load pads, and the forward load pads and aft load pads engage the angled load surfaces of the attachment feature.

5. The turbine shroud assembly of claim 1, wherein the turbine outer case further includes an aft turbine case and the connection flange is a discrete component that is coupled between the mount flange and the aft turbine case.

6. The turbine shroud assembly of claim 5, wherein the connection flange extends radially inward and extends axially forward and aft to form a panel, and an inward radial surface of the panel forms a locating pad that engages the locating surface of the blade track segment.

7. The turbine shroud assembly of claim 5, wherein the connection flange includes a first attachment feature that extends circumferentially about the axis and a plurality of second attachment features that extend radially inward from the first attachment feature such that the second attachment features are circumferentially spaced apart from one another.

8. The turbine shroud assembly of claim 7, wherein the first attachment feature is coupled with the turbine outer case, and the forward and aft carrier segments are coupled to at least one of the plurality of second attachment features.

9. A turbine shroud assembly for use with a gas turbine engine, the turbine shroud assembly comprising
 a turbine outer case having an outer wall arranged around an axis,
 a connection flange coupled for movement with the outer wall and extending radially inward relative to the outer wall,
 a blade track segment including an arcuate runner that extends circumferentially partway around the axis and an attachment feature that extends radially outward from the runner, the attachment feature includes a first radially inward facing angled load surface and a second radially inward facing angled load surface such that the first and second radially inward facing angled load surfaces converge toward each other, and
 a carrier assembly arranged circumferentially partway around the axis, the carrier assembly comprising a forward carrier segment and an aft carrier segment coupled with the connection flange for movement therewith, the forward carrier segment engages the first radially inward facing angled load surface and the aft carrier segment engages the second radially inward facing angled load surface so that the carrier assembly supports the blade track segment radially relative to the axis, and the forward carrier segment and the aft carrier segment are clamped together in compression so that the blade track segment does not move radially relative to the axis in response to thermal growth of the turbine shroud assembly.

10. The turbine shroud assembly of claim 9, wherein the forward carrier segment and the aft carrier segment apply a radial compression force to the attachment feature.

11. The turbine shroud assembly of claim 9, wherein the connection flange and the outer wall are integrally formed as a single, one-piece component.

12. The turbine shroud assembly of claim 9, wherein the forward carrier segment includes a forward radially extending flange that couples with the connection flange and an angled forward load carrying portion that extends axially aft from the forward extending flange and engages the first angled load surface of the blade track segment and the aft carrier segment includes an aft radially extending flange that couples with the connection flange and an angled aft load carrying portion that extends axially forward and engages the second angled load surface of the blade track segment.

13. The turbine shroud assembly of claim 12, wherein the first angled load surface, the second angled load surface, the angled forward load carrying portion, and the angled aft load carrying portion extend in a linear direction.

14. The turbine shroud assembly of claim 9, wherein the arcuate runner and the attachment feature are formed such that the blade track segment has an I-beam shaped cross-section when viewed circumferentially relative to the axis.

15. The turbine shroud assembly of claim 9, wherein the connection flange extends radially inward between the forward and aft carrier segments and engages a radial outer surface of the attachment feature included in the blade track such that the blade track segment is in compression between the forward carrier segment, the aft carrier segment, and the connection flange.

16. The turbine shroud assembly of claim 9, wherein the turbine outer case includes a forward outer case and an aft outer case, the connection flange is located axially between the forward outer case and the aft outer case, and the forward outer case, the aft outer case, and the connection flange are fastened together.

17. The turbine shroud assembly of claim 9, wherein the connection flange is a single-piece component that extends circumferentially about the axis to form a full hoop.

18. A method comprising
 providing a turbine outer case having an outer wall arranged around an axis, a connection flange coupled with the outer wall of the turbine outer case, a blade track segment having an arcuate runner and an attachment feature that extends radially outward away from the arcuate runner, and a carrier assembly comprising a first carrier segment and a second carrier segment,
 aligning the connection flange with the first and second carrier segments,
 aligning the attachment feature of the blade track segment with the first carrier segment and the second carrier segment,
 moving the first carrier segment and the second carrier segment relative to each other to trap the attachment feature between the first carrier segment and the second carrier segment so that load carrying portions included in the first carrier segment and the second carrier segment engage radially inward facing and angled load surfaces of the attachment feature and move the radially inward facing and angled load surfaces radially outward, and
 coupling the first carrier segment and the second carrier segment with the connection flange.

19. The method of claim 18, further comprising engaging a radially outer surface of the attachment feature with the connection flange.

20. The method of claim 18, wherein the load carrying portions included in the first carrier segment and the second carrier segment and the radially inward facing and angled load surfaces of the attachment feature extend along a linear path.

* * * * *